United States Patent
Shin et al.

(10) Patent No.: US 8,859,720 B2
(45) Date of Patent: Oct. 14, 2014

(54) METHOD FOR PREPARING POLYARYLENE SULFIDE

(75) Inventors: Yong-Jun Shin, Seoul (KR); Jae-Bong Lim, Gyeonggi-do (KR); Joon-Sang Cho, Gyeonggi-do (KR); Il-Hoon Cha, Gyeonggi-do (KR); Sung-Gi Kim, Gyeonggi-do (KR)

(73) Assignee: SK Chemicals Co., Ltd. (KR)

( * ) Notice: Subject to any disclaimer, the term of this patent is extended or adjusted under 35 U.S.C. 154(b) by 230 days.

(21) Appl. No.: 13/141,822

(22) PCT Filed: Dec. 22, 2009

(86) PCT No.: PCT/KR2009/007669
§ 371 (c)(1),
(2), (4) Date: Jun. 23, 2011

(87) PCT Pub. No.: WO2010/074482
PCT Pub. Date: Jul. 1, 2010

(65) Prior Publication Data
US 2011/0257363 A1 Oct. 20, 2011

(30) Foreign Application Priority Data
Dec. 23, 2008 (KR) .................... 10-2008-0132486

(51) Int. Cl.
*C08G 75/14* (2006.01)
*C08G 75/02* (2006.01)
*C08G 75/16* (2006.01)

(52) U.S. Cl.
CPC ........ *C08G 75/0209* (2013.01); *C08G 75/0268* (2013.01)
USPC ........... 528/389; 528/374; 528/381; 528/383; 528/492; 528/501; 528/502 R; 528/503

(58) Field of Classification Search
USPC ................ 528/389, 374, 381, 383, 492, 501, 528/502 R, 503
See application file for complete search history.

(56) References Cited

U.S. PATENT DOCUMENTS

| 2,513,188 | A | 6/1950 | Macallum |
| 2,583,941 | A | 1/1952 | Gordon, Jr. |
| 4,746,758 | A | 5/1988 | Rule et al. |
| 4,786,703 | A | 11/1988 | Starner et al. |
| 4,786,713 | A | 11/1988 | Rule |
| 4,945,155 | A | 7/1990 | Fagerburg et al. |
| 5,177,183 | A | 1/1993 | Hay et al. |
| 6,201,098 | B1 | 3/2001 | Haubs et al. |

FOREIGN PATENT DOCUMENTS

| EP | 0403407 A1 | 12/1990 |
| JP | 03500901 A | 2/1991 |
| JP | 04506228 A | 10/1992 |
| JP | 08269199 A | 10/1996 |
| JP | 08319348 A | 12/1996 |
| WO | WO-2008082265 A1 | 7/2008 |

OTHER PUBLICATIONS

International Application Serial No. PCT/KR2009/007669, International Search Report mailed Jul. 20, 2010, (w/ English Translation), 4 pgs.
Chinese Application Serial No. 200980157302.7, Office Action mailed Nov. 16, 2012, 6 pgs.
Japanese Application Serial No. 2011-542018, Office Action mailed Oct. 15, 2013, 3 pgs.

*Primary Examiner* — Duc Truong
(74) *Attorney, Agent, or Firm* — Schwegman Lundberg & Woessner, P.A.

(57) ABSTRACT

The present invention relates to a method for preparing polyarylene sulfide, in which the polyarylene sulfide is prepared by a polymerization reaction of reactants including a diiodo aromatic compound and a sulfur compound, the method including: further adding 0.01 to 10.0 wt. % of diphenyl disulfide with respect to the weight of the polyarylene sulfide to the reactants to form the polyarylene sulfide having a melting point of 265 to 320° C.
The diphenyl disulfide included in the reactants according to the present invention costs far less than other conventional polymerization inhibitors to dramatically lower the production cost, and the polyarylene sulfide prepared using the diphenyl disulfide exhibits low iodine content and very excellence in thermal stability.

7 Claims, No Drawings

METHOD FOR PREPARING POLYARYLENE SULFIDE

CROSS REFERENCE TO RELATED APPLICATION

This application is a nationalization under 35 U.S.C. 371 of PCT/KR2009/007669 filed Dec. 22, 2009 and published as WO 2010/074482 A2 on Jul. 1, 2010, which application claims priority to and the benefit of Korean Patent Application No. 10-2008-0132486, filed Dec. 23, 2008, which applications and publication are incorporated herein by reference in their entirety.

BACKGROUND OF THE INVENTION (a) Field of the Invention

The present invention relates to a method for preparing polyarylene sulfide (hereinafter, referred to as "PAS") and, more particularly, to a method for preparing PAS that involves adding a polymerization inhibitor to reactants to reduce the iodine content of the PAS and to enhance thermal stability.

(b) Description of the Related Art

As a typical engineering plastic, PAS has recently been in considerable demand as a material for high temperature and corrosive environments and electronics products due to its excellence in thermal resistance, chemical resistance, flame resistance, and electrical insulation properties. PAS is primarily used for computer parts, automotive components, protective coatings against corrosive chemicals, industrial chemical resistant fabrics, and so forth.

The only PAS that is commercially available is polyphenylene sulfide (hereinafter, referred to as "PPS"). The current industrial synthesis process for PPS involves a reaction of p-dichlorobenzene (hereinafter, referred to as "pDCB") and sodium sulfide in a polar organic solvent such as N-methyl pyrrolidone. This process is known as "Macallum process", which is disclosed in U.S. Pat. Nos. 2,513,188 and 2,583,941. Among several polar solvents suggested in the prior art, the mostly used one is N-methyl pyrrolidone. The process uses dichloro aromatic compounds as a reactant and yields sodium chloride as a byproduct.

The PPS produced in the Macallum process has a molecular weight around 10,000 to 40,000 and a low melt viscosity less than 3,000 poise. For higher melt viscosity, PPS is usually subjected to the curing process including application of heat below the melting temperature Tm and exposure to oxygen. During the curing process, the melt viscosity of PPS can be raised to a level required for general PPS uses through reactions such as oxidation, cross-bonding, or polymer chain extension.

The PPS obtained in the conventional Macallum process, however, has some fundamental disadvantages as follows.

Firstly, the use of sodium sulfide as a supply of sulfur needed in the polymerization reaction leads to a large amount of metal salt such as sodium chloride as a byproduct in the polymer product. The residual metal salt is contained in the polymer product to several thousand ppm even after the polymer product is washed out, not only to raise the electrical conductivity of the polymer but also to cause corrosion of the processing machinery and problems during spinning of the polymer into fibers. From the standpoint of the manufacturer, the use of sodium sulfide as an ingredient material ends up with the 52%-yield of sodium chloride as a byproduct with respect to the weight of the added material, and the byproduct, sodium chloride, is not economical but wasteful even when recycled.

Secondly, the properties of the polymer product are adversely affected during the curing process. For example, oxygen-driven oxidation and cross-bonding reactions turn the polymer product darker with more brittleness in the aspect of mechanical property.

Thirdly, like all the polymer products of solution polymerization, the final PPS product is prepared in a very fine powder form that relatively lowers the apparent density, causing inconvenience in carrying and some problems during the processing of the PPS into desired goods.

Beside the Macallum process, some other processes have been proposed in U.S. Pat. Nos. 4,746,758 and 4,786,713 and other related patents. These patents suggest that PAS can be prepared by directly heating diiodo compounds and solid sulfur rather than dichloro compounds and metal sulfide used in the existing process without using any polar solvent. This method consists of two steps, iodization and polymerization: the iodization step involves a reaction of aryl compounds and iodine to form a diiodo compound, and the polymerization step includes a reaction of the diiodo compound and solid sulfur to yield PAS having a high molecular weight. During the reaction, there occurs production of iodine in vapor form, which iodine is collectible and reused to react with the aryl compounds again. Hence, the iodine substantially acts like a catalyst in the reaction.

This method can solve the problems with the conventional processes. First, iodine yielded as a byproduct does not raise the electrical conductivity of the PAS product as metal salts usually do, and can be easily collected from the reactants to readily make its content in the final product lower than the content of metal salts in the conventional processes. The collected iodine is reusable in the iodization step, reducing the quantity of waste almost to zero. Second, the polymerization step using no solvent provides the PAS product in the pellet form like the conventional polyester product, avoiding a problem with the product in the powder form according to the prior art. Finally, this method raises the molecular weight of the final PAS product far more than the conventional processes and thus eliminates a need for the curing process that leads to inferior properties of the product.

This process however has two main disadvantages. First, the residual iodine in the molecular state is so corrosive to adversely affect the processing machinery when it is contained in the final PAS product even in a minute amount. Second, the use of solid sulfur in the polymerization step causes introduction of disulfide bonds in the final PAS product to deteriorate the thermal properties of the product including melting temperature.

Consequently, there is a need for studies to develop a method for effectively preparing a PAS that not only considerably lowers the content of iodine causing corrosion of machinery but also provides excellent properties such as thermal resistance, chemical resistance, and mechanical strength.

SUMMARY OF THE INVENTION

Accordingly, it is an object of the present invention to provide a method for preparing PAS that has low iodine content and good thermal stability.

It is another object of the present invention to provide a PAS resin that has low iodine content and good thermal stability.

It is still another object of the present invention to provide molded products, films, sheets or fabrics consisting of the PAS resin.

To achieve the above objects, the present invention provides a method for preparing PAS, in which the PAS is prepared by a polymerization reaction of reactants including a diiodo aromatic compound and a sulfur compound, the method including further adding 0.01 to 10.0 wt. % of diphenyl disulfide with respect to the weight of the PAS to the reactants to form a PAS having a melting temperature of 265 to 320° C.

The present invention also provides a PAS being prepared by the above method and having a melting temperature of 265 to 320° C., and a molded product using the PAS.

DETAILED DESCRIPTION OF THE EMBODIMENTS

Hereinafter, a description will be given about the present invention in further detail.

The inventors of the present invention noticed the problems pertaining to the use of the conventional polymerization inhibitors and focused on the solutions based on chemical methods. The reason for removing iodine from the final polymer product lies in the economical aspect as well as corrosiveness of the iodine. The way that iodine gets in the polymer product during the above-described new process falls into two cases: the one case of having iodine molecules directly included in the polymer; and the other having iodine atoms bonded to the aryl group of the polymer. The present invention has a focus on the solution of the latter case of problem, since the solution of the former case primarily depends on the equipment or conditions for the polymerization reaction.

The present invention is to introduce a novel method for preparing PAS that includes maintaining at a constant level or reducing the content of residual iodine in the final polymer product and adding diphenyl disulfide (hereinafter, referred to as "PDS") as a polymerization inhibitor in a polymerization process for PAS in a different manner from the prior industrial process. The present invention is also to specify a method of improving the problem with the conventional process that the PAS product undesirably has a low melting temperature Tm and consequently a deterioration of thermal stability according to the temperature applied.

To find out a way to improve the prior art, the inventors of the present invention have made extensive studies to reveal that PDS is very cheap but effective in removing iodine contained in the PAS polymer to an equivalent or higher extent and that the PAS polymer thus obtained has a high melting temperature Tm with improved thermal stability. The present invention is completed based on these studies. Accordingly, the object of the present invention is to provide a method for preparing PAS that not only reduces the production cost and the iodine content of the PAS polymer but also improves the properties of the PAS such as thermal stability.

In particular, the present invention relates to a method for preparing PAS, in which the PAS is prepared by a polymerization reaction of reactants including a diiodo aromatic compound and a sulfur compound, the method including further adding 0.01 to 10.0 wt. % of diphenyl disulfide with respect to the weight of the PAS to the reactants to form a PAS having a melting temperature of 265 to 320° C.

The final PAS product of the present invention has a melting temperature Tm of 265 to 320° C., preferably 268 to 290° C., more preferably 270 to 285° C. By securing the melting temperature Tm in such a high range, the PAS of the present invention applied as an engineering plastic can exert good performances such as high strength and enhanced thermal resistance. On the other hand, the PAS synthesized by the preparation method according to the above-described embodiment of the present invention shows high strength characteristic, that is, a tensile strength of 600 to 800 kgf/cm$^2$ as measured according to ASTM D638.

The PAS has an iodine content of 10 to 10,000 ppm, preferably 100 to 4,500 ppm, more preferably 150 to 3,000 ppm, most preferably 200 to 1,500 ppm. The present invention may reduce the iodine content to a considerably low level relative to the prior art by adding DPS as a polymerization inhibitor, thereby minimizing a risk of corrosion in the processing machinery.

The PAS has a melt viscosity of 100 to 100,000 poise, preferably 150 to 5,000 poise, more preferably 200 to 20,000 poise, most preferably 300 to 15,000 poise. By securing such an enhanced melt viscosity, the PAS of the present invention applied as an engineering plastic can realize good performances such as high strength and enhanced thermal resistance. The polymerization reaction can be carried out after a melt mixing of the reactants. According to the preferred embodiment of the present invention, the reactants including the diiodo aromatic compound and the sulfur compound are melt-mixed at 150 to 250° C. and then subjected to polymerization reaction.

The polymerization reaction occurs under temperature and pressure conditions that initiate polymerization but are not specifically limited. The temperature and pressure conditions are controlled to allow the polymerization reaction for 1 to 30 hours under initial reaction conditions, a temperature of 180 to 250° C. and a pressure of 50 to 450 torr, and then under final reaction conditions, an elevated temperature of 270 to 350° C. and a reduced pressure of 0.001 to 20 torr. In case of performing polymerization under the temperature and pressure conditions changing from the initial reaction conditions to the final conditions of elevated temperature and reduced pressure, the polymerization reaction rate gets faster and the polymer product, PAS, exhibit enhanced qualities in regard to thermal stability and mechanical properties.

The diiodo aromatic compound as used in the present invention includes, but is not limited to, at least one selected from diiodobenzene (DIB), diiodonaphthalene, diiodobiphenyl, diiodobisphenol, or diiodobenzophenone; any one of these diiodo aromatic compounds that has an alkyl or sulfone substituent; or an aryl compound containing an oxygen or nitrogen atom. The diiodo compound forms distinctly different kinds of isomers according to the position of iodine substituents. The most preferable isomer of the diiodo compound is a compound having iodine substituents symmetrically positioned on both ends of the molecular and separated at the longest distance from each other, such as pDIB, 2,6-diiodonaphthalene, or p,p'-diiodobiphenyl.

The sulfur compound as used herein has no limitation in its form. Normally, sulfur exists as cyclooctasulfur (S8) in the form of a ring consisting of eight sulfur atoms. Though, the sulfur compound may be any kind of solid sulfur commercially available.

The PAS polymerization step in this process according to an embodiment of the present invention includes: melting and mixing a diiodo aryl compound and sulfur as reactants along with a relatively small amount of an additive; adding, if necessary, a catalyst such as a nitro compound, PDS, and a stabilizer to the mixture; and carrying out a polymerization reaction under high temperature condition in the range of 180 to 250° C., preferably 240° C. or above.

More preferably, as previously described, the polymerization reaction can be carried out for 1 to 30 hours under initial reaction conditions, a temperature of 180 to 250° C. and a pressure of 50 to 450 torr and then under final reaction conditions, an elevated temperature of 270 to 350° C. and a reduced pressure of 0.001 to 20 torr.

Particularly, the preparation method of the present invention involves accomplishing the polymerization reaction of a diiodo aromatic compound and a sulfur compound in the presence of a nitrobenzene-based catalyst. The inventors of the present invention have found out that the use of a nitrobenzene-based catalyst in the polymerization of a diiodo aromatic compound and a sulfur compound ends up with a PAS product having a raised melting temperature with high thermal stability. In fact, the presence of a catalyst makes little difference in the progress of a polymerization reaction. But, PPS polymerization without a catalyst results in the yield of a PPS polymer having a considerably low melting temperature, consequently with a problem in regard to the thermal resistance of the product as demonstrated in the following comparative example 1. Therefore, the selection of an appropriate reaction catalyst is of a great importance. The catalyst as used herein may include, but not limited to, 1,3-diiodo-4-nitrobenzene, or 1-iodo-4-nitrobenzene.

The PAS preparation method of the present invention is characterized by the use of PDS (Diphenyl Disulfide) as a polymerization inhibitor.

In the present invention, the polymerization inhibitor is used to remove the PAS molecule of the iodine molecules, which is remaining at the end of the PAS molecule. Any residual iodine molecules at the end of the PAS molecule even after an utmost effort of removing the iodine molecules from the polymer are likely to react with an ultimately small amount of a sulfur molecule present in the polymer. Such a small amount of iodine comes out of the polymer to cause corrosion of the processing machinery during the subsequent heating process on the PAS polymer. The use of a polymerization inhibitor is more necessary in order to collect the used iodine, which is very expensive. This even prevents an abnormal rise of the viscosity of the polymer during the molding process. In other words, the selection of an efficient polymerization inhibitor is vital and indispensable in the PAS polymerization.

The amount of the PDS used as a polymerization inhibitor is not specifically limited and may be 0.01 to 10.0 wt. %, preferably 0.05 to 7.5 wt. %, more preferably 0.1 to 5.0 wt. % with respect to the weight of the PAS prepared from a reaction of the diiodo aromatic compound and the sulfur compound. The used amount of PDS less than 0.01 wt. % has little effect of the PDS, while the amount of PDS greater than 10.0 wt. % results in a lower viscosity of the PAS and a deterioration of profitability due to an excessive amount of raw materials used.

Besides, the process of synthesizing PAS from diiodo arylene and sulfur produces a polymer chain containing disulfides and multisulfides due to the characteristic of the process. In this case, the sulfides adversely affect the thermal stability of the PAS and deteriorate the resistance to oxygen and organic solvents. PDS, which is reactive to disulfides and multisulfides, can also improve the properties of the PAS.

Accordingly, the disulfide bonds are contained in the PAS of the present invention in an amount of 0.001 to 5.0%, preferably 0.01 to 3.0 wt. % with respect to the weight of the sulfur.

The present invention also provides a PAS that is prepared by the above-described method and has a melting temperature in the range of 265 to 320° C.

The present invention also provides a product prepared by molding the PAS, and the product may be provided in the form of molded products, films, sheets, or fabrics.

The PAS of the present invention may be processed into any kind of molded products by injection molding or extrusion molding. The examples of the molded products include injection-molded products, extrusion-molded products, or blow molded products. As for injection molding, the molding temperature is preferably 30° C. or above, more preferably 60° C. or above, most preferably 80° C. or above in the aspect of crystallization; and preferably 150° C. or below, more preferably 140° C. or below, most preferably 130° C. or below in the aspect of the deformation of test species. These molded products can used as electrical/electronic parts, building components, automotive components, mechanical parts, daily-use articles, and so forth.

The films or sheets may be prepared in the form of any kind of films such as non-oriented film, or uni-axially or bi-axially oriented film, or sheets. The fabrics may be prepared in the form of any kind of fabrics such as non-oriented fabric, oriented fabric, or ultra-oriented fabric, and used as woven fabric, knitted fabric, nonwoven fabric (spoon bond, melt blow, or staple), ropes, nets, or the like.

Hereinafter, the present invention will be described in further detail with reference to the examples and comparative examples, which are not intended to limit the scope of the present invention.

EXAMPLES

Preparation of PAS

Example 1

0.60 g of PDS (0.65 wt. % with respect to the weight of the final PPS product) was added to 300.00 g of pDIB and 27.00 g of sulfur, and the mixture was heated to 180° C. Completely melt and mixed, the mixture was subjected to polymerization for 8 hours under initial conditions of a temperature of 220° C. and a pressure of 200 Torr and then under final conditions of a gradually elevated temperature of 320° C. and a reduced pressure of 1 Torr. The final PPS product weighed 92 g.

The polymer product was 89.1 g (96.7% yield) with melt viscosity MV 5,300 poise, melting temperature Tm 274.3° C., iodine content 610 ppm, and disulfide bond content 0.5 wt. %.

Example 2

The procedures were carried out as described in Example 1 to accomplish a polymerization reaction under the same conditions of Example 1, excepting that PDS was added in an amount of 1.00 g (1.1 wt. % with respect to the weight of PPS). The property analysis of the polymer was also performed in the same manner as described in Example 1. The polymer product was 90.2 g (98.3% yield) with melt viscosity MV 1,800 poise, melting temperature Tm 277.5° C., iodine content 250 ppm, and disulfide bond content 0.4 wt. %.

Example 3

The procedures were carried out as described in Examples 1 to accomplish a polymerization reaction under the same conditions of Example 1, excepting that 0.3 g of 1,3-diiodo-4-nitrobenzene was added as a reaction catalyst during a first melt mixing of pDIB and sulfur, and that the PDS was added in an amount of 1.00 g (1.1 wt. % with respect to the weight of PPS). The property analysis of the polymer was also performed in the same manner as described in Example 1. The polymer produce was 90.9 g (99.0% yield) with melt viscosity MV 2,500 poise, melting temperature Tm 277.1° C., iodine content 300 ppm, and disulfide bond content 0.3 wt. %.

Comparative Examples

Preparation of PAS

Comparative Example 1

The procedures were carried out as described in Example 1 to accomplish a polymerization reaction under the same conditions of Example 1, excepting that no separate polymerization inhibitor was added. The property analysis of the polymer was also performed in the same manner as described in Example 1. The polymer product was 88.1 g (95.9% yield) with melt viscosity MV 10,000 poise, melting temperature Tm 235.5° C., iodine content 7,000 ppm, and disulfide bond content 3.5 wt. %.

Comparative Example 2

The procedures were carried out as described in Example 1 to accomplish a polymerization reaction under the same conditions of Example 1, excepting that 1.50 g of 4-iodobiphenyl was added without using PDS. The property analysis of the polymer was also performed in the same manner as described in Example 1. The polymer product was 89.5 g (97.5% yield) with melt viscosity MV 2,600 poise, melting temperature Tm 235.0° C., iodine content 1,500 ppm, and disulfide bond content 3.0 wt. %.

Comparative Example 3

The procedures were carried out as described in Example 1 to accomplish a polymerization reaction under the same conditions of Example 1, excepting that 0.3 g of 1,3-diiodo-4-nitrobenzene was added as a reaction catalyst during a first melt mixing of pDIB and sulfur, without using PDS. The property analysis of the polymer was performed in the same manner as described in Example 1. The polymer product had a melt viscosity MV of 8,750 poise, melting temperature Tm 252.7° C., iodine content 5,500 ppm, and disulfide bond content 2.0 wt. %.

Comparative Example 4

The procedures were carried out as described in Example 1 to accomplish a polymerization reaction under the same conditions of Example 1, excepting that 10.0 g of PDS was added (10.9 wt. % with respect to the weight of PPS). The property analysis of the polymer was performed in the same manner as described in Example 1. The polymer product was 92.8 g (101.1% yield) with melt viscosity MV 10 poise, melting temperature Tm 260.8° C., iodine content 1,000 ppm, and disulfide bond content 0.5 wt. %.

Experimental Examples

Property Measurement of PAS

The PAS resins prepared in Examples 1, 2 and 3 and Comparative Examples 1 to 4 were measured in regard to properties as follows. The measurement results are presented in Table 1.

1. Melt Viscosity

The melt viscosity (MV) was measured at 300° C. with a rotating disk viscometer.

2. Melting Temperature

The melting temperature was determined with a differential scanning calorimeter (DSC).

3. Iodine Content

To analyze the iodine content in the resins prepared in the examples and the comparative examples, each sample was grinded, and a given amount of the sample was combusted and ionized in an adsorbent such as pure water. The concentration of iodine ions was determined by the combustion ion chromatography using a combustion system AQF-100 (Mitshubishi Corporation) and an IC system ICS-2500 (DIONEX Corporation).

4. Disulfide Bond Ratio

To determine the disulfide bond ratio of each resin prepared in the examples and the comparative examples, the theoretical amount of sulfur contained in PAS was subtracted from the total amount of sulfur measured by element analysis to give the weight of sulfur, which is divided by the theoretical amount of sulfur in PAS and then doubled. The determined value was expressed in weight percentage. The element analysis was accomplished with EA1110 (CE Instruments).

5. Tensile Strength

The resins were molded into species in the shape of dog bone with an injection molding machine. The species were kept under experimental conditions (23° C., relative humidity RH 50%) for 48 hours and measured in regard to tensile strength as specified in the U.S. standard test method, ASTM D638.

TABLE 1

|  | Polymerization Inhibitor | | Catalyst | | Disulfide bond | Melt Viscosity | | Iodine Content | Tensile Strength |
| --- | --- | --- | --- | --- | --- | --- | --- | --- | --- |
|  | Type | Amount | Type | Amount (g) | (wt. %) | (poise) | Tm (° C.) | (ppm) | (kgf/cm²) |
| E 1 | DPS | 0.60 | - | - | 0.5 | 5300 | 274.3 | 610 | 682 |
| E 2 | DPS | 1.00 | - | - | 0.4 | 1800 | 277.5 | 250 | 702 |
| E 3 | DPS | 1.00 | B* | 0.30 | 0.3 | 2500 | 277.1 | 300 | 720 |
| CE 1 | - | - | - | - | 3.5 | 10000 | 235.5 | 7000 | 280 |
| CE 2 | A* | 1.50 | - | - | 3.0 | 2600 | 235.0 | 1500 | 320 |
| CE 3 | - | - | B* | 0.30 | 2.0 | 8750 | 252.7 | 5500 | 420 |
| CE 4 | DPS | 10.0 | - | - | 0.5 | 10 | 260.8 | 1000 | 10 |

Note)
E 1-3: Example 1-3
CE 1-4: Comparative Example 1-4
DPS: Diphenyl Disulfide
A*: 4-iodo-biphenyl
B*: 1,3-diiodo-4-nitrobenzene As presented in Table 1, compared to the PAS resins of Comparative Examples 1 to 4 in which there was used no polymerization inhibitor, or an excess of the polymerization inhibitor, or an iodine compound known as a conventional polymerization inhibitor, the PAS resins of Examples 1, 2 and 3 of the present invention not only showed a remarkable decrease in the iodine content and the disulfide bond content but also secured an enhanced melting temperature Tm to maintain or improve other properties, preferably heat stability.

Moreover, the resins of Comparative Examples 1 to 4 had a deterioration of the thermal properties including melting temperature and failed to satisfy high strength and enhanced thermal resistance when applied as an engineering plastic. Particularly, the resin of Comparative Example 4 using an excess of PDS showed a drastic reduction of melt viscosity and tensile strength and has a problem in acquiring strength high enough to be used as an engineering plastic.

What is claimed is:

1. A method for preparing polyarylene sulfide, in which the polyarylene sulfide is prepared by a polymerization reaction of reactants including a diiodo aromatic compound and a sulfur compound, the method including:

further adding 0.01 to 10.0 wt. % of diphenyl disulfide with respect to the weight of the polyarylene sulfide to the reactants to form the polyarylene sulfide having a melting point of 265 to 320° C., wherein the polymerization reaction is carried out in the presence of a nitrobenzene-based catalyst.

2. The method as claimed in claim 1, wherein the polymerization reaction is carried out for 1 to 30 hours under an initial condition including a temperature of 180 to 250° C. and a pressure of 50 to 450 torr and then under a final condition including an elevated temperature of 270 to 350° C. and a reduced pressure of 0.001 to 20 torr.

3. The method as claimed in claim 1, wherein the polyarylene sulfide has an iodine content of 10 to 10,000 ppm.

4. The method as claimed in claim 1, wherein the polyarylene sulfide has a melt viscosity of 100 to 100,000 poise.

5. The method as claimed in claim 1, wherein the diiodo aromatic compound includes at least one selected from the group consisting of diiodobenzene, diiodonaphthalene, diiodobiphenyl, diiodobisphenol, or diiodobenzophenone.

6. The method as claimed in claim 1, wherein the polyarylene sulfide contains 0.001 to 5.0 wt. % of disulfide bond with respect to the total weight of sulfur.

7. The method of claim 1, wherein the polyarylene sulfide has a tensile strength of 600 to 800 kgf/cm$^2$ as measured according to ASTM D638.

* * * * *